July 19, 1932.   R. P. SIMMONS   1,867,769
WELL HOUSING APPARATUS
Filed Aug. 16, 1929     5 Sheets-Sheet 1
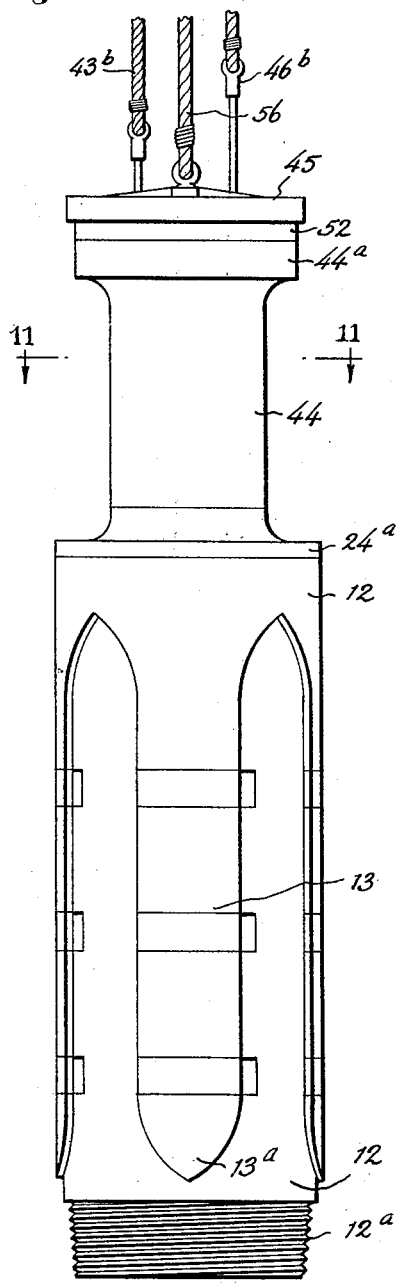
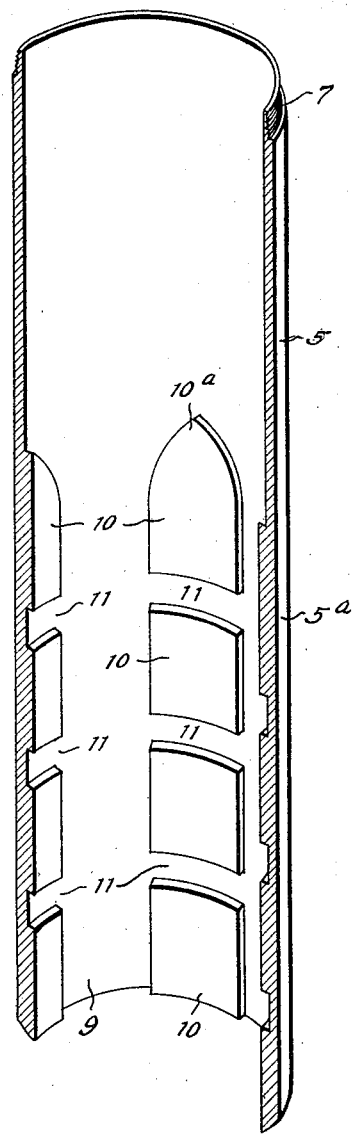
Richard P. Simmons
INVENTOR
BY Victor J. Evans
ATTORNEY

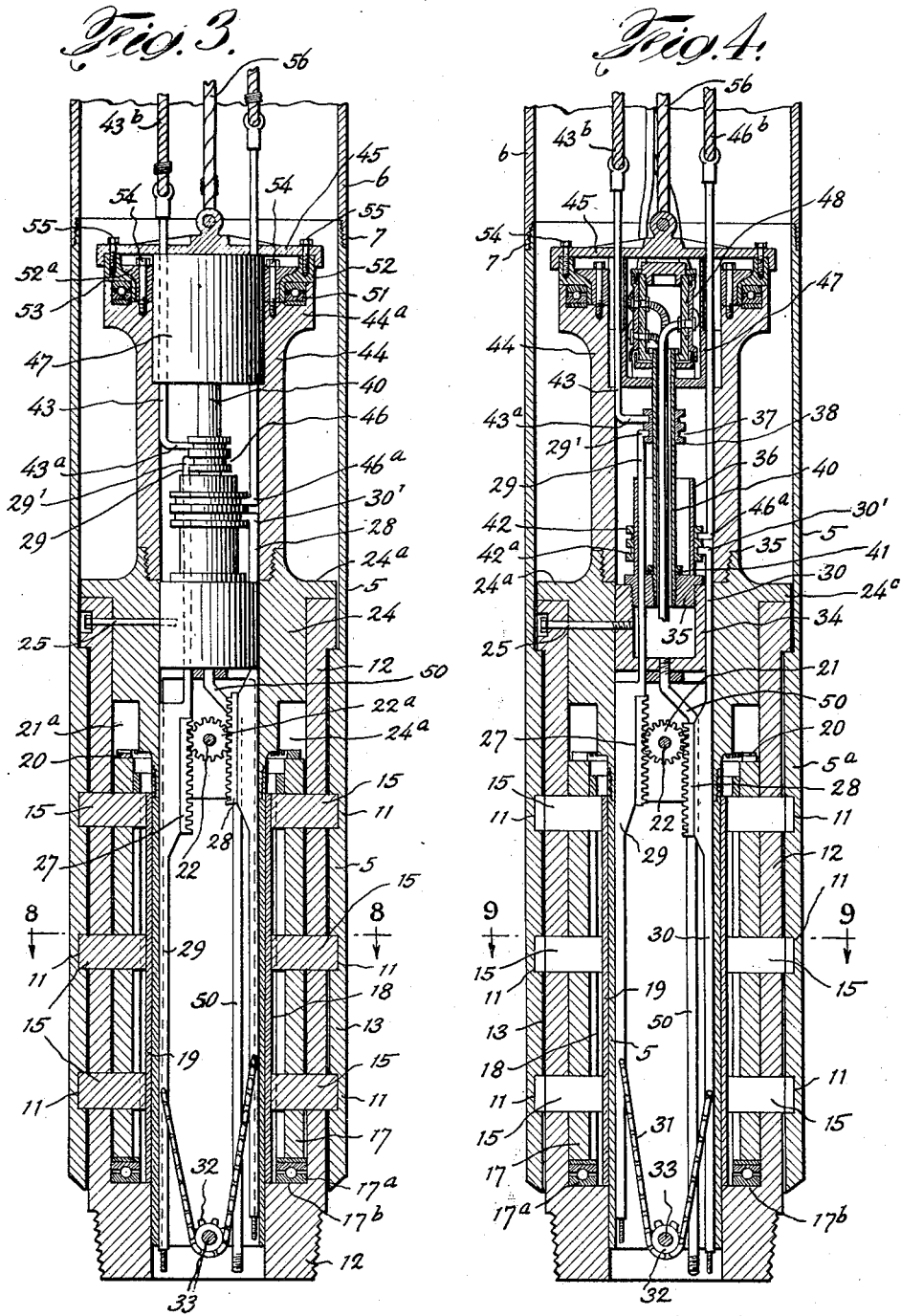

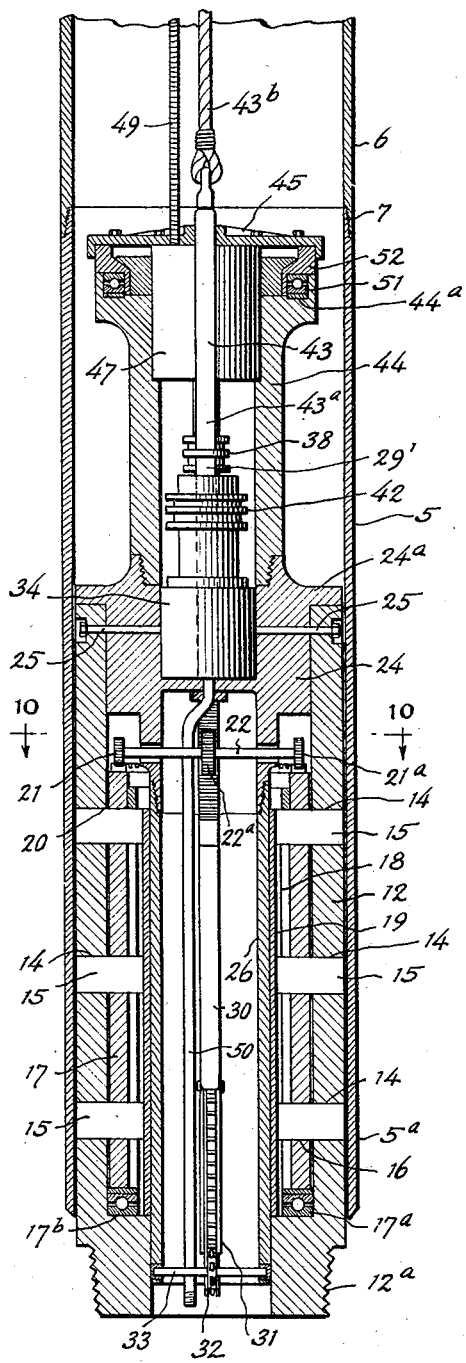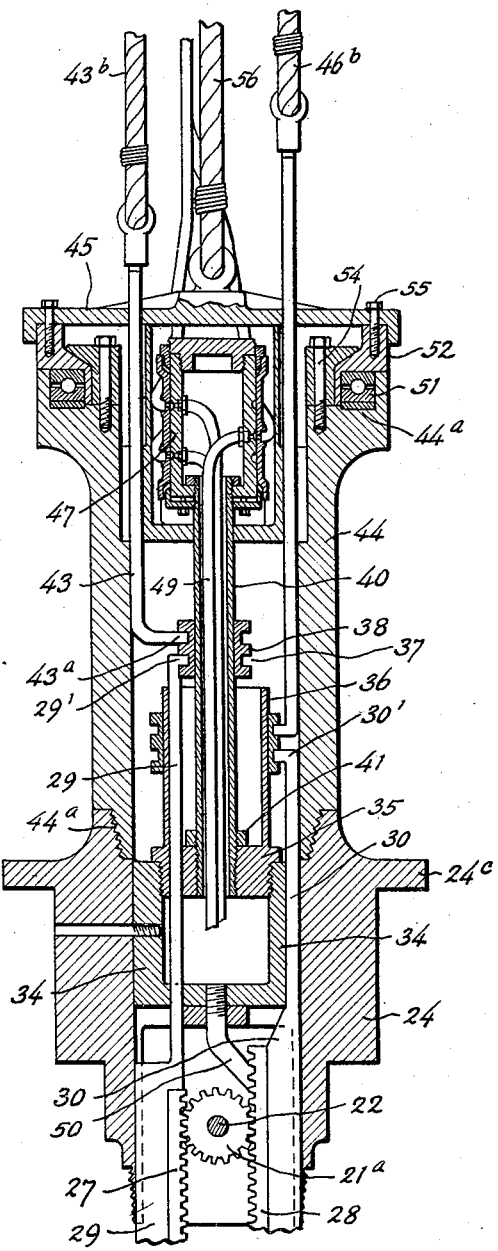

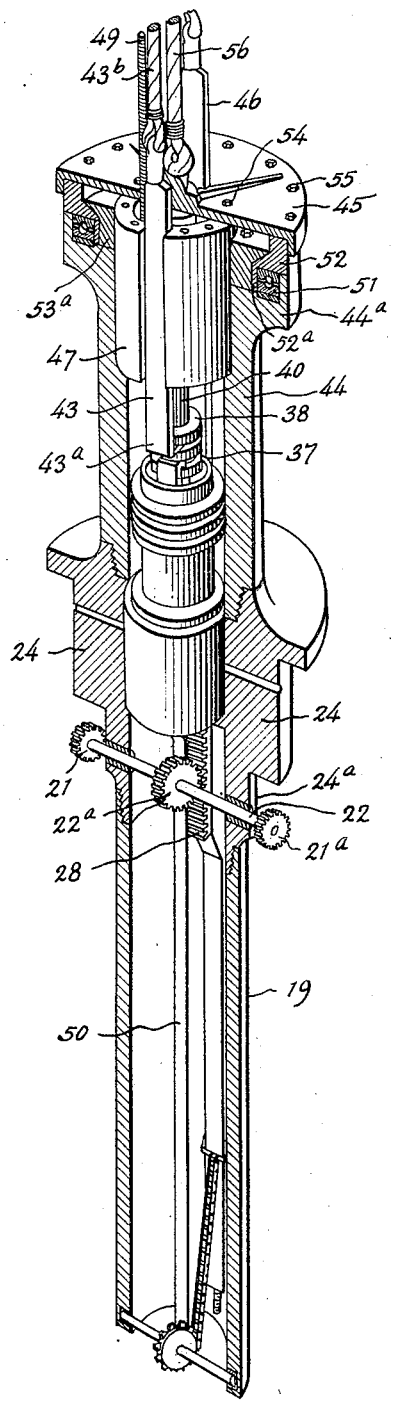
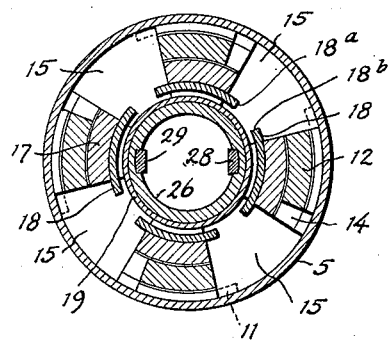
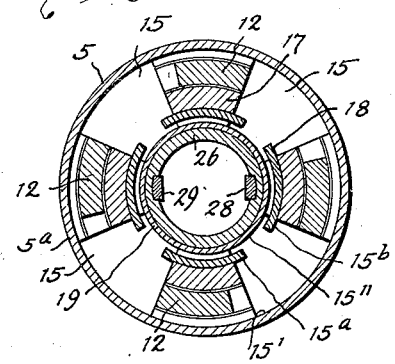
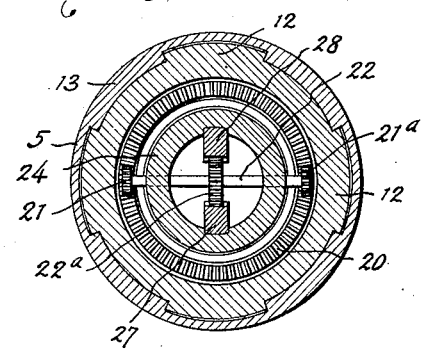

July 19, 1932.    R. P. SIMMONS    1,867,769
WELL HOUSING APPARATUS
Filed Aug. 16, 1929    5 Sheets-Sheet 5

Richard P. Simmons
INVENTOR
BY Victor J. Evans
ATTORNE

Patented July 19, 1932

1,867,769

UNITED STATES PATENT OFFICE

RICHARD P. SIMMONS, OF NEW YORK, N. Y.

WELL HOUSING APPARATUS

Application filed August 16, 1929. Serial No. 386,354.

This invention relates to improvements in well forming apparatus, of the type disclosed in my co-pending applications for Patents, Serial Number 192,449, filed May 18th, 1927; Serial Number 213,381, filed August 16, 1927; Serial Number 232,663, filed November 11, 1927; and Serial Number 272,799, filed April 25, 1928.

The leading object of the present invention is to provide the combination of a tubular head and a casing, each having longitudinal keyways and alternately arranged keys, shaped to admit of forced longitudinal alignment, and with one or more keys of each key carrier (tubular head and casing) each incorporating one or more transverse or lesser keyways or slots matchable when the alignment aforesaid is attained; the slot in the head having movable and movably controlled radially spaced keys therein; these last mentioned keys being hereinafter termed the lesser keys, or the locking lugs, and preferably arcuately movable,—whereby said lesser keys or lugs may be first aligned with the slots of the casing or lesser keyways and then, when the head and casing keys are properly interfitted, these lugs may be, in effect, rotated, to enter and interlock with the slots of the casing, whereby in turn, quick interlocking of the head with the casing may be positively accomplished.

Another object of the invention is the provision of means for simultaneously shifting the movable lesser keys or lugs into preferably arcuate slots of the casing, by a pulling operation accomplished from the top of the well which is being drilled or operated.

A still further object of the invention is the provision of additional means for stabilizing the operation of the lug shifting means, which additional means can also be utilized for operating independent locking or connecting means below the level of the tubular head.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show an embodiment of the invention as at present preferred. The scope of protection contemplated, of course, is to be taken on the appended claims, interpreted as broadly as is consistent with the prior art.

In the drawings:—

Fig. 1 is a side elevation of the improved head removed from the casing, showing the lesser keys or lugs in the initial or unlocked position.

Fig. 2 is partially a longitudinal section and partially an interior perspective view of the casing, showing the aligning keys therein, and the transverse slots in said aligning keys.

Fig. 3 is a longitudinal sectional view of the head in locked relation to the casing.

Fig. 4 is a similar view, showing the lesser keys or lugs in unlocked positions.

Fig. 5 is a longitudinal sectional view taken at right angles to the line of the sections shown in Figs. 3 and 4.

Fig. 6 is a longitudinal sectional view, on an enlarged scale, with portions broken away, of a part of the head removed from the casing.

Fig. 7 is a perspective view, partially in longitudinal section, showing most clearly certain operating pinions and certain gear and rack equalizing connections;

Fig. 8 is a transverse sectional view taken on line 8—8 of Fig. 3, looking in the direction of the arrows.

Fig. 9 is a similar view taken on line 9—9 of Fig. 4, looking in the direction of the arrows.

Fig. 10 is a transverse sectional view taken on line 10—10 of Fig. 5, looking in the direction of the arrows.

Similar reference characters refer to similar parts throughout the several views of the drawings.

Figure 11:
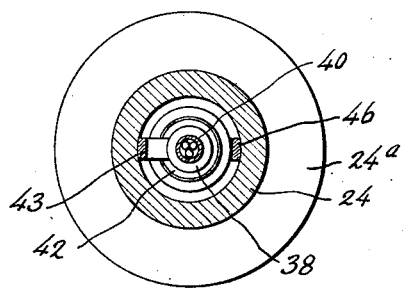
Fig. 11 is a detail transverse sectional view taken on line 11—11 of Fig. 1, looking in the direction of the arrows.
Figure 13:
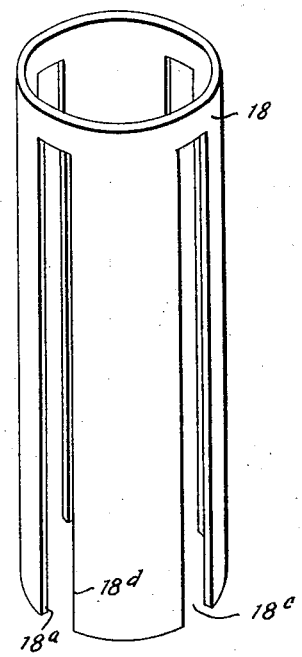
Fig. 13 is a perspective view of a split cylinder lock for the lesser keys.

Various arrangements have been devised in the past to interlock the head of a well apparatus to the lower section of the casing, commonly employed for maintaining the well against collapse, and to provide, in the practice of my improved equipment, a guide to permit the withdrawal of the head, without requiring the removal of the casing. But the interlocking devices disclosed in the prior art do not function under the actual conditions encountered in well boring and well operating, and have doubtful practicability. I have found it useful to improve the means shown in my prior applications by securing a forced longitudinal alignment between the well casing and the head working therein, and then locking the head to the casing only after this forced longitudinal alignment and interlocking has been accomplished, so that a positive locking in all directions of the well head to the casing is obtained from the ground, from which the boring operations are conducted.

In accompanying drawings showing the embodiment of the invention here preferred, 5 designates a lower section of a tubular well casing, and 6 a next upper section which is threaded thereto at 7. The wall of the casing section 5 is reduced in thickness from a point shown (indicated at X in Fig. 2) to be approximately midway of the ends thereof.

The thicker part 5a of the casing wall is formed with a series of radially spaced keyways 9, which are separated from each other by integral sectional keys 10, the upper end portions of which keys are brought to rather broadly curved and pointed terminals 10a, designed to offer a minimum of resistance to the entrance of similarly pointed head-keys therebetween, and to prevent any accidental jam or lock or direct stoppage against the upper ends of the casing keys 10. The sections of the longitudinal keys 10 thus formed are spaced apart to provide a series of transverse keyways 11, of the same approximate width as the keys 10, but all in the same longitudinal plane.

In the casing a well head 12 is mounted. This tubular head, the head actually referred to, is formed with an external pipe thread 12a on its lower end, and with a series of integral longitudinal keys 13 located on the outer surface thereof; these keys formed with curved and pointed lower terminal portions 13a, as just above mentioned, to permit of the positive insertion of the same in the keyways 9. The spaces between the keys 13 form keyways 13b to receive the keys 10, so one set of keys may interlock with the other set of keys, both laterally and longitudinally, and the parts may be multi-splined together, positively to prevent relative movement in any direction and to any degree, when interlocked, as by the means now to be described.

Figure 12:
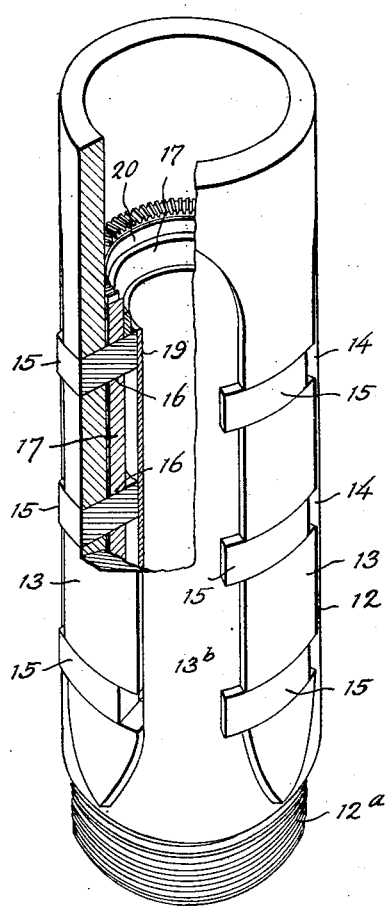
Fig. 12 is a detail perspective view of the head, partially broken away and partially in section, showing the arrangement of the lesser keys or lugs and the ring gear or circular rack for operating the same.
Figure 14:
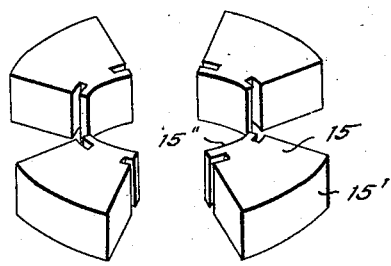
Fig. 14 is a view in perspective of a circumferential series of lesser keys.

The wall of the head 12, which is tubular, is formed with a series of slots 14, cut through the same and mainly located in the zone of the keys 13 of said head and partly to one side thereof, as best made clear in Fig. 12. As shown, a group of three of such slots is located in the same longitudinal zone as each key 13, extending only a short distance into the adjacent keyway of the head.

Lesser keys or lugs 15 are arranged to occupy the slots 14, and the outer edge portions of these keys have radial edges 15' corresponding to the curvature of the outer periphery of tubular head 12. The lugs 15 are shown to be segmental in form, with the inner edge portion 15'' of each lug 15 formed with arcuate recesses 15a and 15b in the opposite sides thereof. The keys 15 also work through transverse slots 16 formed in the wall of an intermediate tube 17, arranged within the tubular wall of the head 12, and inwardly of this tube 17 a split cylinder or tube 18 is interlocked with the edge recesses 15a and 15b of lugs 15. The cylinder 18 is cut away in four places, or any number corresponding to the number of keys 15 employed, so that the parallel edges 18a and 18b on the sides of the longitudinal slots 18c thus formed will enter the recesses 15a and 15b of said keys 15, and the keys will be therefore held under control in their slots. Inwardly of the slotted tubular member 18 a cylindrical dirt guard or tube 19 is located, so as to protect the keys 15, and prevent their binding in the slots in which they are designed to work under distant control.

The intermediate tube 17 carries a circular ring gear 20 on its upper end, which is fixed thereto, and this gear 20 is engaged by pinions 21 and 21a which are mounted on the ends of a shaft 22. The shaft carries a gear 22a. This shaft is journaled in opposed bearings 23 of a tubular plug 24, which is fitted in the tubular head 12 and pinned thereto, as shown in Figs. 3 and 4 by the pin 25.

The wall of the lower portion of the tubular plug 24 is reduced at 24a to provide pockets in which the pinion gears 21 and 21a work, and the lower end of said reduced wall is externally threaded and coupled to an inner tube 26.

Within the inner tube 26 and the bore of the tubular plug 24, racks 27 and 28 are arranged for vertical movement, the former being in constant mesh with the pinion 22a and the latter being in constant mesh with the pinion 21a. The rack 27 is carried by a suitably guided bar 29 and the rack 28 is carried by a similar bar 28. The lower end of the former is extended downwardly and is threaded to receive any extension which may be added thereto, while the lower end of the rack bar 30 is likewise extended downwardly and is threaded to receive any extension which may be coupled thereto. A stabilizing or equalizing chain 31 is connected at its ends to the bars 29 and 28 and works over a sprocket gear 32, which is carried on a small cross shaft 33 journaled to the lower end of the inner tube 26.

The upper end of the rack bar 29 is reduced and extends upwardly through a cup plug 34, and thence through a plug 35, being threaded therein. This plug 35 is formed with an integral upstanding tube 36, through which the rack bar 29 extends to engage a circumscribing groove 37 of a spool 38, which is mounted on a tube 40, the lower end of which is threaded in the plug 35 and locked in place by a nut 41.

The rack bar 28 is extended upwardly between the cup plug 34 and the tubular plug 24 and engages a circumscribing groove 42a of a spool 42, which is mounted on the tubular extension 36 of the plug 35. The upper end of the rack bar 29 is provided with a small offset portion 29' to engage the groove 37, and the upper end of the rack bar 28 is provided with a similar offset portion 30' which holds the bar interlocked with the spool 42.

A pull bar or rod 43 has its offset lower end 43a engaged with the upper groove 37 of the spool 38, and this pull bar extends upwardly through a tubular head piece of extension 44, which carries a detachable cap 45, through which the pull rod or bar 43 slidably extends.

A second pull rod or bar 46 also extends through the cap 45 and the extension 44, and its lower end is offset at 46a and engaged with the upper groove 42a of the spool 42. A cable 43a is connected to the upper end of the pull rod 43 and a cable 46a is connected to the upper end of the pull rod 46. Both of these cables extend to the ground surface for manual operation.

Within the upper end of the extension tube 44 a housing or case 47 is arranged, immediately under the cap 45. In this housing air line coupling means 48 are arranged, which transfer the air fed from an air pressure tube 49, which extends upwardly to the ground level, to the cup plug 35, and thence by a pipe 30 to any equipment within the lower part of the well apparatus at a point below the stabilizing chain. The details of this air equipment need not be further explained in the present specification, in view of what has already been taught in the art.

The lower end of the intermediate tube 17 engages a thrust ball bearing 17a, which is supported on a shoulder 17b provided on the lower end of the well head 12. The cap 45 (Fig. 3) is mounted on the tubular extension 44 so that it will freely swivel thereon, and for this purpose a ball bearing ring 51 is arranged on a shoulder 44a, formed in the upper end of the extension 44. This ball bearing ring is directly engaged by a ring 52, which is provided (Fig. 7) with a dependent flange 52a, formed on the inner periphery of the said ring, and this flange is engaged by an internal dependent flange 53a on a ring 53, which ring is secured positively by bolts 54 to the end of the extension 44. The cap 45 is detachably secured to the ring 52 by bolts 55, so that said cap will swivel on the upper ball bearing ring 51.

The composite well head thus described is carried within the casing by means of a cable 56, which extends to the ground level.

In use the lower end of the casing enclosing the well head is forced in the hole and is advanced as the hole is increased in depth, by the usual practice of turning the drill head, not shown. As the depth of penetration increases, additional sections must be added to the casing and the difficulty of continuing the drilling increases. In the ordinary practice the whole casing assembly, together with the head assembly, is withdrawn.

With my improved head assembly, withdrawal of the casing is not necessary in order to remove any débris or core waste which has collected in the well or within the device itself. In its working position, the head assembly will be coupled to the casing, through the movable keys 15, against relative longitudinal and relative rotative movement. When it is desired to withdraw the head assembly, which usually carries the drilling head, the lowermost of the two pull rods or bars is pulled, thus causing the gear rack connected therewith to rotate the pinion engaged by said rack, and this will cause the circular gear rack and its intermediate tube to turn, thus forcing the lesser keys 15 laterally of their normal positions out of the slots between the external keys of the tubular head 12. This will free the head 12 and its assembly from the locking which prevents its longitudinal withdrawal, and by pulling upon the cable 56 the head assembly may be elevated, leaving the casing in place in the well.

After the necessary repairs or adjustments of the head assembly, or after any withdrawal of the head assembly for any other purpose, as to empty the cut residue from a core barrel, the head assembly can be readily lowered into the casing. When the head assembly nearly reaches the limit of its downward travel in the casing, the pointed ends of the longitudinal keys 13 will be positively interlocked against relative rotative movement. By pulling upon the lowermost pull bar or rod the pinion gears will be operated to cause the intermediate tube to turn upon its ball bearing ring, thus shifting the lesser keys 15 into the transverse keyways or slots of the casing, and thereby positively locking the head assembly against the longitudinal movement.

The hereinbefore described construction admits of considerable modifications without departing from the invention; therefore, I do not wish to be limited to the precise arrangements shown and described, which are, as aforesaid, by way of illustration merely. In other words, the scope of protection contemplated is to be taken solely from the appended claims, interpreted as broadly as is consistent with the prior art.

Having described my invention I claim:

1. A well apparatus comprising a casing, a head group insertable therein, means for interlocking the head group to the casing so arranged that forced registration of the cooperating parts in positive interlocking relation against relative rotative movement is established by vertical movement of the head group within the casing, and means movable through the head group against the casing and engageable with said first named means to interlock the head group to the casing against longitudinal movement.

2. A well apparatus comprising a casing, a head group insertable therein, means for interlocking the head group to the casing so arranged that forced registration of the cooperating parts is established by the movement of the head group within the casing, and means arcuately movable through the head group against the casing to interlock the head group to the casing against longitudinal movement.

3. A well apparatus comprising a casing formed with longitudinal keys radially spaced from each other, said keys having transverse keyways, a head group insertable in the casing, said head group having a series of external keys adapted to snugly fit between the keys of the casing, and a series of keys movable through non-radial paths and through the wall of the head group to engage the transverse keyways of the casing.

4. A well apparatus consisting of a casing formed with a series of longitudinal keys radially spaced from each other, each of said keys having a keyway extending across the same, all of said keyways being in the same plane, a head insertable in the casing and provided with external keys to interlock with the keys of the casing to prevent relative rotative movement, said head having a series of slots mainly located in the planes of its keys and extending for a portion of their length into the spaces between said keys, a series of segmental keys arranged in said slots and adapted to interlock with the keyways of the casing, and means operable from the ground for causing the segmental keys to move into the casing keyways to interlock the head in the casing against relative longitudinal movement.

5. The well apparatus defined in claim 4, wherein there are means operable from the ground for causing the segmental keys to move to unlock head and casing.

6. A well apparatus consisting of a casing formed with a series of longitudinal keys radially spaced from each other, and a head insertable therein and provided with a series of similar keys located on the outer face thereof, the upper ends of the casing keys and the lower ends of the head keys being pointed so that they will readily pass one another when the head is pushed in the casing, the cooperating longitudinal keys having fitting action to prevent relative rotative movement of the head in the casing and circumferentially shiftable locking elements cooperative between said longitudinal keys and said similar keys to prevent relative longitudinal movement of said head in said casing.

7. A well apparatus consisting of a casing formed with a series of longitudinal keys radially spaced from each other, and a head insertable therein and provided with a series of similar keys located on the outer face thereof, the upper ends of the casing keys and the lower ends of the head keys being pointed so that they will readily pass one another when the head is pushed in the casing, said head having a series of slots located mainly in the vertical plane of its keys and extending partly into the spaces between said head keys, a tube within the head having similar slots, a gear ring on said tube, a series of lesser keys disposed in the slots of said tube and in the corresponding slots of the head, a gear to engage the ring, and a gear rack engaging the gear and adapted to be operated by a distant pull element.

8. A well apparatus consisting of a casing, a head, means for interlocking the head in the casing designed to insure forced alignment of the parts for said interlocking, means movable transversely through the head to interlock against relative longitudinal movement, means for shifting said movable means, and means operable by a pulling operation from the ground above the well for actuating the shifting means in opposite directions at will, one direction for rendering said locking means operative, and the other direction for rendering said locking means inoperative.

9. A well apparatus consisting of a casing, a head insertable therein, means for interlocking the head to the casing against relative rotative movement, said means being so constructed that forced registration of the cooperating interlocking parts is obtained, keys movable through the head through paths non-acentric thereto to engage the casing, said keys being retained in normal registration with the interlocking means of the head to avoid obstructing said interlocking, a tube engaging the keys, a gear ring on said tube, a support secured to the head, and a shaft mounted on said support and provided with a gear to engage the ring.

10. The well apparatus defined in claim 9, wherein there is provided a pair of gear racks to engage and propel the shaft in opposite directions and operable at will from a point distant of the head to rotate the shaft in one selected direction or the other.

11. A well apparatus consisting of a casing provided with a series of internal longitudinal keys radially spaced from each other, a head insertable in the casing and provided with a series of external longitudinal keys radially spaced from each other, a series of lesser keys movable through the head to interlock with the casing to prevent relative longitudinal movement between head and casing, said keys to permit of insertion of the said external keys of the head between the internal keys of the casing, the internal keys of the casing having transverse keyways in the same plane but in the vertical planes of said internal keys, and remote control means for forcing the lesser keys into and out of the transverse keyways of the casing.

12. The apparatus defined in claim 11, wherein said lesser keys are movable through paths more arcuate than radial.

13. The combination with an oil well casing of a locking head insertable in the casing, said casing having recesses in its wall, and locking elements shiftable circumferentially in the locking head to engage and disengage with said recess.

14. The combination with an oil well casing having a recess in its wall, of a locking head insertable in said casing, a locking member shiftable circumferentially in said locking head to engage with and disengage from said recess, and pushing and pulling means within the locking head for operating said locking means and adapted to be operated by connecting cables extending to the head of the well.

15. The combination of an oil well casing having a plurality of recesses in its wall spaced circumferentially from each other and a plurality of spaced internal keys, a locking head insertable in the casing and provided with external keys adapted to interfit between the keys of the casing, locking elements mounted to slide in the locking head to engage and disengage with said recesses, means for operating said locking elements enclosed by said locking head, flexible means connected with said operating means, and air coupling means arranged in the locking head end constructed to provide a continuous flow of air in different paths through the locking head and to permit of the relative rotation of the associated parts.

16. A locking head for oil well casing comprising a body having circumferentially spaced slots in its wall, a cylinder in said head carrying a series of locking elements extending through said spaced slots, said cylinder having a gear ring on its end, gear wheels for turning said ring, a member within said cylinder providing a pair for said gears, opposed gear racks engageable with said shaft of said gears, and cables connected with said gear racks operating the same from the well.

17. An apparatus as set forth in claim 13, including means operable at the ground surface for shifting said locking elements.

18. An apparatus as set forth in claim 1, including rack and gear devices operatively connected to the means movable through the head group for actuating said movable means.

19. An apparatus as set forth in claim 3, including pulling elements operable at a point a substantial distance above said head group for actuating said movable keys.

20. An apparatus as set forth in claim 1, including a pair of pulling elements operable from the ground surface and operatively connected to the means movable through the head group for actuating said movable means in opposite directions, and stabilizing means cooperative between said pulling elements.

In testimony whereof I hereby affix my signature.

RICHARD P. SIMMONS.